US009164667B2

(12) United States Patent
Speer et al.

(10) Patent No.: US 9,164,667 B2
(45) Date of Patent: Oct. 20, 2015

(54) WORD CLOUD ROTATABLE THROUGH N DIMENSIONS VIA USER INTERFACE

(71) Applicant: Luminoso Technologies, Inc., Cambridge, MA (US)

(72) Inventors: Robert Speer, Cambridge, MA (US); Yuri Vishnevsky, Cambridge, MA (US)

(73) Assignee: Luminoso Technologies, Inc., Cambridge, MA (US)

( * ) Notice: Subject to any disclaimer, the term of this patent is extended or adjusted under 35 U.S.C. 154(b) by 456 days.

(21) Appl. No.: 13/840,009

(22) Filed: Mar. 15, 2013

(65) Prior Publication Data

US 2014/0282244 A1  Sep. 18, 2014

(51) Int. Cl.
*G06F 17/20* (2006.01)
*G06F 3/0484* (2013.01)
*G06F 17/21* (2006.01)
*G06F 17/30* (2006.01)

(52) U.S. Cl.
CPC .......... *G06F 3/04842* (2013.01); *G06F 17/211* (2013.01); *G06F 17/30061* (2013.01)

(58) Field of Classification Search
CPC .................. G06F 17/30061; G06F 17/211
USPC ........................................................ 715/764
See application file for complete search history.

(56) References Cited

U.S. PATENT DOCUMENTS

| | | | |
|---|---|---|---|
| 6,349,316 B2 * | 2/2002 | Fein et al. | 715/267 |
| 6,549,898 B1 * | 4/2003 | Inaba et al. | 715/255 |
| 6,654,739 B1 * | 11/2003 | Apte et al. | |
| 6,704,698 B1 * | 3/2004 | Paulsen et al. | 704/1 |
| 7,003,725 B2 * | 2/2006 | Castellanos et al. | 715/257 |
| 7,644,047 B2 * | 1/2010 | Assadian et al. | 706/1 |
| 8,254,692 B2 * | 8/2012 | Ramachandrula et al. | 382/197 |
| 8,402,030 B1 * | 3/2013 | Pyle et al. | 707/738 |
| 2004/0034660 A1 * | 2/2004 | Chen et al. | 707/104.1 |
| 2006/0206483 A1 * | 9/2006 | Knepper et al. | 707/7 |
| 2008/0154926 A1 * | 6/2008 | Newman | 707/100 |
| 2010/0005083 A1 * | 1/2010 | Morgana et al. | 707/5 |
| 2010/0138426 A1 * | 6/2010 | Nakayama et al. | 707/741 |
| 2011/0040562 A1 * | 2/2011 | Doyle et al. | 704/251 |
| 2011/0087668 A1 * | 4/2011 | Thomas et al. | 707/738 |
| 2012/0303637 A1 * | 11/2012 | Carmel et al. | 707/749 |

OTHER PUBLICATIONS

WordPress Tip: Rotating Flash Tag Clouds <http://idratherbewriting.com/2009/02/19/rotating-flash-clouds-and-the-question-of-content-organization/>, Feb. 2009, 8 pages.*
Cui, Weiwei et al, Context Preserving Dynamic Word Cloud Visualization, IEEE Pacific Visualisation Symposium 2010, Mar. 2-5, 2010.*

* cited by examiner

*Primary Examiner* — Cesar Paula
*Assistant Examiner* — Mohammed-Ibrahim Zuberi
(74) *Attorney, Agent, or Firm* — Law Office of Ilya Libenzon (57) ABSTRACT

A system and related method are disclosed for rendering a set of words linked to an n-dimensional vector space in a word cloud rendered from a two-dimensional projection of the vector space, where the user can click and drag a word, and the subspace and projection thereon will shift to place the word where the user has dragged it in a new projection, and the other words in the cloud will shift correspondingly, offering the user new insights. The importance of words in a document set is represented by word size, and relatedness between words demonstrated by color similarity.

20 Claims, 4 Drawing Sheets

WORD CLOUD ROTATABLE THROUGH N DIMENSIONS VIA USER INTERFACE

TECHNICAL FIELD

Embodiments of the present invention relate generally to computerized representations of multidimensional data sets, and in particular to projection of multidimensional data sets onto word clouds.

BACKGROUND ART

Word clouds exist to aid in the problem of comprehending extremely large and complex masses of information concerning the words they display. Examples abound of sets of data of sufficient complexity to be unimaginable in their entirety. Human intuition works very well when comparing two or three categories of data; for example, the relationship between height and weight in a population, which can be depicted with a two-dimensional Cartesian graph, or the relationship between height, weight, and longevity, which requires a three-dimensional graph; it may be hard to draw, but it is not particularly taxing to the imagination. However, it is quite common to encounter a database table that contains a hundred or more columns, each recording a different category of facts about the subject of study. To depict every relationship between all of the categories of data in a hundred-columned table would require a hundred-dimensional graph, or a graph with not only an x-axis, a y-axis, and a z-axis, but 97 other axes; even if there were a way to draw such a graph in its entirety, the result would be totally incomprehensible to even the most adept mind at spatial reasoning.

One way to respond to this level of complexity is to project the multiplicity of dimensions onto a two or three-dimensional space, in such a way as to preserve some aspect of the relationship between the many dimensions. The two or three dimensional space in itself may be depicted in two or three dimensions, and thus is amenable to human comprehension. By way of analogy, imagine a light shining on a cube so that its shadow is cast on a sheet of paper. When the light is shone on a single face of the cube, and the paper parallels the cube's opposite face, the shadow of the cube on the paper, or its two-dimensional projection, would be a square. If the paper faced one corner of the cube and the light shone upon the opposite vertex, the projection might appear hexagonal. A person viewing a series of such projections, while understanding how they were produced, could use them to deduce the shape of the overall cube.

Of course, to analyze a cube in this way would be unnecessary, but one way to explore a four-dimensional "cube," defined as a four-dimensional polyhedron in which all edges are the same length and join orthogonally, is to view a series of three-dimensional figures that represent projections of the hypercube onto three dimensions. The same approach could be used to study a 100-dimensional "cube." Likewise, while it is impossible to depict the relationship between 100 categories of data in a single comprehensible drawing, it is possible to draw relationships between any two or three categories in the set. Similarly, one may use this approach to depict relationships between two or three combinations of categories. For instance, in a data set made up of physical and demographic data concerning a group of people, one could graph height to weight ratio against blood pressure, which would be a projection of the data set onto two dimensions, one of which was a combination of two dimensions in the data set. To explore the relationships between other categories in the data set would require a different projection. The foregoing example is extremely simple. The selection of a projection, and the number of relationships that the projection can produce, can be far subtler and involve much more sophisticated mathematics.

Once the data has been projected onto a manageable set of dimensions, the challenge is to portray the information in that projection in a way that is intuitively meaningful to a person viewing the depiction. One efficient way to depict a three-dimensional set of relationships between categories of data, particularly data pertaining to texts, is with a "word cloud." A word cloud is a kind of weighted list in which a set of words, often words taken from a particular text, is displayed as on a page, and in which at least the font size of each depicted word varies depending on some attribute concerning the word. For example, the positions of the words in the word cloud could be determined by alphabetical order, and the sizes of the words in the word cloud could depend on how frequently each word appears in a text. The positions of the words in the cloud could also be determined by size of the words, by aesthetic considerations, or by further information about relationships between the words that the designer of the word cloud wished to convey. Some word clouds use colors as well as numbers to show something about the words; a bi-chromatic word cloud, for example, could allow the viewer to see which person in a dialogue uttered a given word. A more subtle use of coloring is exemplified by collocate clouds, which use shades of color to depict how frequently a given word appears only with the word the user has provided, while the size of a given word indicates how frequently the word appears in a text within a given distance of the word provided by the user. A cloud that uses all of the attributes mentioned above to display some piece of information about a word can depict a surprising amount of data in an intuitively clear way, if properly designed.

It is hardly surprising that word clouds, which necessarily involve a lot of searching, sorting, and computation involving large volumes of data, are generally created by software, and are most often encountered in internet applications. There are many software programs available on the web or on stand-alone computers that generate various kinds of word clouds, using the design parameters described above among others. The extant word cloud generation programs have in common a tendency to produce a single view of a given word cloud, reflecting one particularly interesting way of analyzing the textual or other data the program is designed to display. While the results can be fascinating, the programs currently in existence do not permit the user to explore the underlying data sets more fully by customizing the word clouds and manipulating the data projections that form the clouds' internal basis. Thus, there remains a need for a word cloud generating program that fully exploits the word clouds' potential to bring complex data within the reach of intelligent comprehension.

SUMMARY OF THE EMBODIMENTS

It is therefore a purpose of this invention to provide the user with a visual tool that enables the user to shift the projection underlying a word cloud to produce a clearer vision of the data the user needs to understand. It is a further purpose of this invention to allow users intuitively to explore multifaceted relationships between words in one or many documents by representing those relationships in a direct and easily-understood way. It is yet a further object of this invention to enhance the traditional word cloud by making it able to change fluidly in response to user input.

One embodiment of this invention is a method performed by at least one computer or similar device having a processor and a memory that projects an n-dimensional textual data set onto a two-dimensional subspace, displays it in a word cloud representation of a two-dimensional projection of the data set, and finally allows the user to explore the word-cloud by selecting and moving any word in the word cloud. First, the computer or computers provide a display space with a two dimensional coordinate system in which each pixel in has a corresponding set of coordinates. Next, the system generates a textual data set whose members consist of a set of words, each of which is associated with an n-dimensional vector whose n components the system populates with numerical values. Those vectors together define an n-dimensional data space. The system then calculates a size attribute for each word in the textual data set by finding some metric according to which it can rank the words. The system then stores the data set in memory.

Next, the system projects all of the vectors described above onto two dimensions, and flattens the projection into a word cloud. It does so by creating an initial two-dimensional subspace, and storing it in its memory. The system then projects the vectors from the textual data set onto the two-dimensional subspace. Next, the system proceeds to flatten the two-dimensional projection just produced onto a word cloud. It does so by placing each word from the textual data set in the display space at coordinates dictated by its vector's projection on the subspace. Each word is displayed with a font size corresponding to its size attribute.

The last portion of the method allows the user to explore the textual data set interactively using the word cloud. The user selects and moves a word in the cloud, using a mouse, touchscreen, keyboard, or other component that allows the user to perform manual manipulations on images displayed by computers and similar devices. The system uses a particular animation frame rate to perform a series of shifts, causing the selected word to follow (ideally without perceptible delay) the motion the user has commanded it to follow. For each frame, the system calculates the change in position corresponding to the portion of the user's motion input that occurred during that frame. The system then changes the two-dimensional subspace so that the projection of the selected word's associated vector causes the selected word to be displayed at the new location dictated by that frame's change in position. The system then repeats the step of vector projection using the new subspace, and places each word at its new projection. Those steps are repeating for each frame until the system detects that the user has stopped moving the selected word, at which point the word cloud is displayed as before, using each word's associated vector's most recent projection based on the most recently modified subspace.

In a related embodiment, the step of generating a textual data set is accomplished by providing a document set, creating a matrix containing data from the set, and then using the matrix to produce the n-dimensional vectors. A further method involves maintaining some representation of each document from that set of documents, accepting a user-input search query, matching the query to the document representations, and displaying any documents that match the query. In another embodiment, the size attribute of each word is determined using a term frequency-inverse document frequency calculation. In a further embodiment, the initial creation of the subspace is performed in such a way that each of the n dimensions' projections points in a different direction in the two-dimensional subspace. An additional embodiment involves maintaining a list of word categories in the machine memory, for example containing swear-words or other words the user does not want displayed, and altering the display of any word that matches a category from that list. In a further embodiment still, the system calculates a metric for degree of relatedness between two words, and upon receiving a user selection of a word displays the selected word in a color that contrasts with the default display color, and displays all other words with coloration indicating the degree of relatedness between that each word and the selected word. In still another method, the degree of relatedness between two words is determined by cosine similarity. In addition, one related method involves displaying a list of vectors in the data space, each with an associated color, recording a user selection of one or more vectors from that list, and changing the display color of each word to reflect its similarity to each selected word. Finally, one more method involves the user creation of a vector on that list of vectors with associated colors, by accepting user-input search query, converting that query into a vector in the n-dimensional data space, assigning a display color to that vector, saving the vector with its display color into memory, and displaying the vector and display color as a member of the list of vectors.

Also disclosed herein is a system for performing the above method. The system includes one computer or similar device, or a set of such devices linked by a network, coupled to a display and to data entry means, whose processor or processors are instructed by computer programs to create an application. The application has a Processing Component configured to generate a textual data set whose members consist of a set of words, each of which is associated with an n-dimensional vector populated by n numerical values, the vectors defining an n-dimensional data space. The Processing Component is also designed to calculate a size attribute for each word in the textual data set. The Processing Component also performs the calculations to project those vectors onto two dimensions, by creating an initial two-dimensional subspace and calculating the projection of each n-dimensional vector onto that subspace. Finally, the Processing Component derives a new two-dimensional subspace space and vector projections thereon given a user-selected vector in the n-dimensional vector space, and data representing a change in position, deriving the new subspace to reflect the change in position. The application also has a Display Component configured to display word clouds in a display space with a two dimensional coordinate system in which each pixel has a set of coordinates, by displaying a word cloud given the set of n-dimensional vectors with projections and corresponding words with calculated size attributes. The Display Component places each word in at coordinates determined by the word's vector's projection, and displays each word with a font size corresponding to its size attribute. The application also has a Data Entry Component configured to capture data entered by the user. In particular, the Data Entry Component captures a user selection of a word displayed in the word cloud and records the selection of that word's corresponding n-dimensional vector. The Data Entry Component also captures a user motion input by selecting a frame rate for animating the movement corresponding to the user's motion input. Then, for each frame, it calculates the change in position corresponding to the portion of the user's motion input that occurred during the frame. It repeats this for each frame until the user stops moving the selected word. The Data Entry Component also identifies the cessation of the motion input. Finally, the application's Data Storage Component stores the textual data set in the memory so as to preserve each word's relationship with its associated vector, stores each new instance of the subspace in the memory, and stores each vector's projections in the memory.

In a related embodiment, the Processing Component is configured to generate the textual data set by providing a document set, obtaining the words from the document set, creating a matrix containing data concerning the words and documents, and using the matrix to produce the n-dimensional vectors. In an additional embodiment, the Data Storage Component is configured to maintain a representation of each document in its memory, the Data Entry Component is configured to accept a query from a user via the device or devices' manual data entry means, the Processing Component is configured to match the query to the document representations, and the Display Component is configured to display matching documents. In another embodiment, the Processing Component is configured to calculate each word's size attribute using a term frequency-inverse document frequency calculation. According to another embodiment, the Processing Component is further configured to initialize the subspace so that each of the n dimensions' projections points in a different direction within the subspace. In an additional embodiment, the Data Storage Component is further configured to maintain a list of word categories in its memory, such as a list of words whose display the user considers inappropriate, the Processing Component is configured to compare words from the textual data set to the word categories on the list, and the Display Component is configured to alter the display of words that match. A further embodiment involves configuring the Processing Component to calculate a metric for degree of relatedness between two word/vector pairs and configuring the Display Component to display a selected word in a color that contrasts with the default display color and to display all other words with coloration indicating the degree of relatedness between each word and the selected word. In yet another embodiment, the Processing Component is configured to calculate the metric for degree of relatedness between two vectors using cosine similarity. Under another embodiment, the Display Component is configured to display a list of vectors in the data space, each with an associated color, and given one or more selected vectors from the list to change the display color of each word to reflect its similarity to each selected vector, and the Data Entry Component is configured to record a user selection of one or more vectors from the list. Finally, in one more embodiment the Data Entry Component is configured to accept a user-input search query, the Processing Component is configured to convert that query into a vector in the n-dimensional data space and to assign a display color to the vector, the Data Storage Component is configured to save the vector with its display color in the device memory, and the Display Component is configured to display the vector with its display color as a member of the list of vectors.

Other aspects, embodiments and features of the invention will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The preceding summary, as well as the following detailed description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

DETAILED DESCRIPTION OF SPECIFIC EMBODIMENTS

The disclosed invention produces a data set whose elements are word-vector pairs. Each vector has a certain number of components, denoted herein by the letter n, and each of the n components contains some numerical datum concerning the word associated with the vector. As the foregoing discussion makes clear, the set of vectors may be seen as an n-dimensional set, and when n is a hundred or more, involves a confusingly large quantity of data. The textual data set may be generated via an intermediate step involving a matrix containing data that concerns relationships between words in texts, such as term-document matrix or a word-association matrix. The invention projects the set of vectors onto a two-dimensional space, and then uses the positions of the projections in that space to display a word cloud. The words in the cloud have font sizes corresponding to some measure of the words' relative importance, and can be colored to indicate relationships between the words. The user can click and drag any word in the cloud, and the motion of the word is reproduced by the invention by changing the two-dimensional subspace, and recalculating the vector projections on that subspace, to cause the resultant word cloud to display the selected word where it has been moved (or near to that spot). The other words in the cloud also move according to the shifted projection. In this way, the user can view the data set from many different directions in the original data space, and gain insight into the relationships between the words and their associated vectors.

To persons skilled in the art, it will be apparent that the above described manipulations involve performing a vast number of arithmetic calculations extremely rapidly. A single document can contain thousands of words; some, like the Oxford English Dictionary contain hundreds of thousands. Even in a very small collection of this kind, of approximately one hundred documents each containing only about a thousand distinct words, represented in a term-document matrix representation, if every word is represented by a 100-dimensional vector, projecting all of the vectors in the space onto two 100-dimensional basis vectors would require hundreds of thousands of multiplications and additions, followed by the storage of all the thousands of projection vectors in a readily available form for further manipulation. Considering that this set of calculations must be performed in milliseconds to smoothly animate the motion of words in the cloud to follow a user input in real time, a computer-based solution is the only way to produce the effects the disclosed method can achieve.

Definitions. As used in this description and the accompanying claims, the following terms shall have the meanings indicated, unless the context otherwise requires.

An "electronic device" is defined herein as including personal computers, laptops, tablets, smart phones, and any other electronic device capable of supporting an application as claimed herein.

A "word" is any string of symbols that may be represented as text on an electronic device as defined herein. In addition to single words made of letters in the conventional sense, the meaning of "word" as used herein includes without limitation a phrase made of such words, a sequence of nucleotides described by AGTC notation, any string of numerical digits, and any string of symbols whether their meanings are known or unknown to any person.

A "vector space" follows the mathematical definition of a vector space as a non-empty set of objects called "vectors," and is closed under the operations of vector addition and scalar multiplication. In practical terms, the vectors discussed herein will consist of lists of numbers, where each entry in the list is called a "component" of the vector. A vector with n components is described herein as an "n-dimensional vector." A vector space is "n-dimensional" if it is spanned by a set of n vectors. For the purposes of this application, it will be assumed that the large collections of vectors with n components contemplated by this invention will span an n-dimensional space, although it is theoretically possible that the space defined by a particular collection of n-dimensional vectors as defined herein will have fewer than n dimensions; the invention would still function equally well under such circumstances. A "subspace" of an n-dimensional vector space is a vector space spanned by fewer than n vectors contained within the vector space. In particular, a two dimensional subspace of a vector space may be defined by any two orthogonal vectors contained within the vector space.

"Projection" of one vector u onto another vector v, as used herein, shall mean the orthogonal projection of u onto v, as defined in the following formula:

$$\frac{u \cdot v}{u \cdot u} u$$

where the dot product u·v is defined for all u and v of n dimensions as the conventional dot or scalar product of two vectors, and in practical terms is defined as:

$$\sum_{i=0}^{n} u_i v_i$$

A vector's "norm" is a scalar value indicating the vector's length or size, and is defined in the conventional sense for an n-dimensional vector a as:

$$\|a\| = \sqrt{\sum_{i=0}^{n} a_i^2}$$

A vector is "normalized" if it has been turned into a vector of length 1, or "unit vector," by scalar-multiplying the vector with the multiplicative inverse of its norm.

A device or component is "coupled" to an electronic device if it is so related to that device that the product or means and the device may be operated together as one machine. In particular, a piece of electronic equipment is coupled to an electronic device if it is incorporated in the electronic device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the electronic device by shared membership in some network consisting of wireless and wired connections between multiple machines (e.g. a printer in an office that prints documents to computers belonging to that office, no matter where they are, so long as they and the printer can connect to the internet).

"Data entry means" is a general term for all equipment coupled to an electronic device that may be used to enter data into that device. This definition includes, without limitation, keyboards, computer mouses, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure.

An electronic device's "manual data entry means" is the set of all data entry devices coupled to the electronic device that permit the user to enter data into the electronic device using manual manipulation. Manual entry means include without limitation keyboards, keypads, touchscreens, track-pads, computer mouses, buttons, and other similar components.

An electronic device's "display means" is a device coupled to the electronic device, by means of which the electronic device can display images. Display means include without limitation monitors, screens, television devices, and projectors.

To "maintain" data in the memory of an electronic device means to store that data in that memory in a form convenient for retrieval as required by the algorithm at issue, and to retrieve, update, or delete the data as needed.

Figure 2:
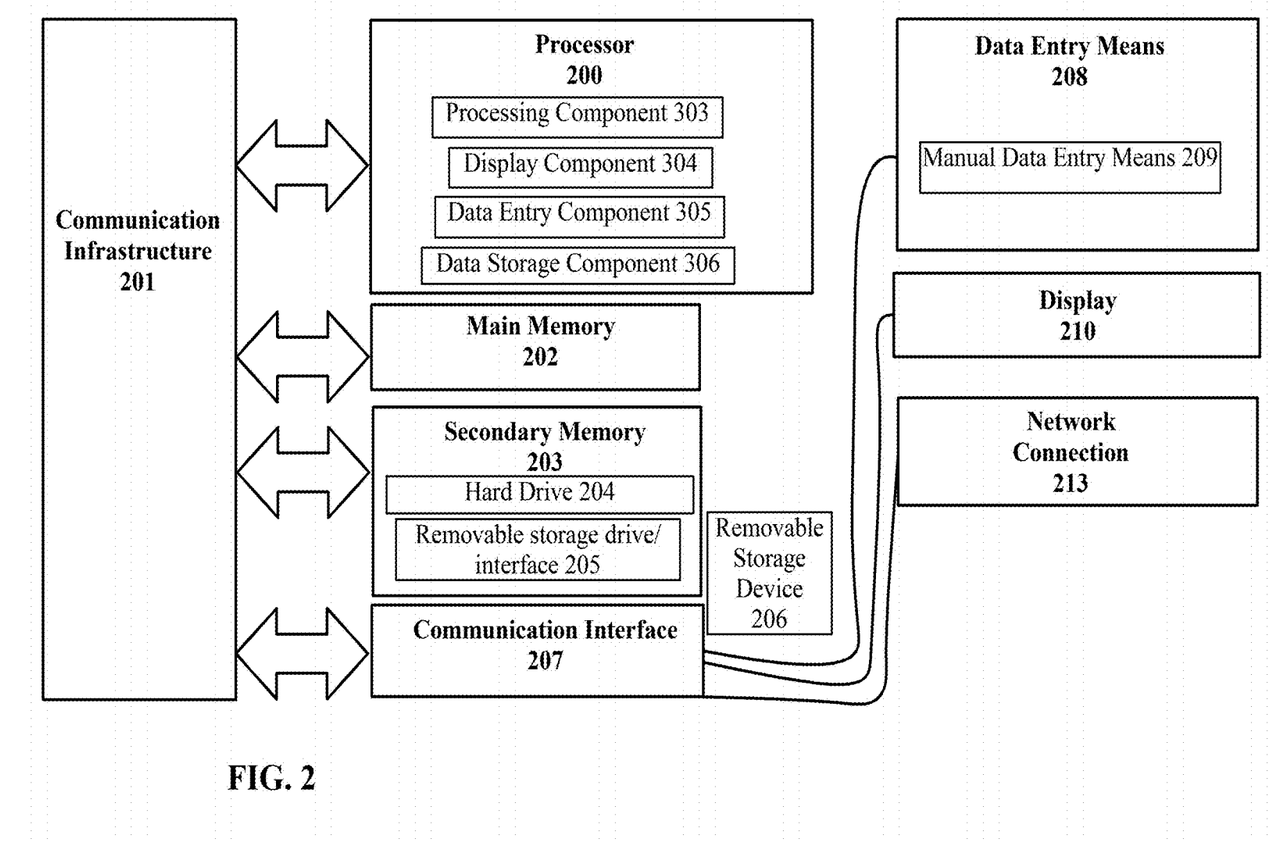
FIG. 2 is a schematic diagram illustrating an electronic device, as described herein.

The system and method disclosed herein will be better understood in light of the following observations concerning the electronic devices that support the disclosed web application, and concerning the nature of applications in general. An exemplary electronic device is illustrated by FIG. 2. The processor 200 may be a special purpose or a general purpose processor device. As will be appreciated by persons skilled in the relevant art, the processor device 200 may also be a single processor in a multi-core/multiprocessor system, such system operating alone, or in a cluster of computing devices operating in a cluster or server farm. The processor 200 is connected to a communication infrastructure 201, for example, a bus, message queue, network, or multi-core message-passing scheme.

The electronic device also includes a main memory 202, such as random access memory (RAM), and may also include a secondary memory 203. Secondary memory 203 may include, for example, a hard disk drive 204, a removable storage drive or interface 205, connected to a removable storage unit 206, or other similar means. As will be appreciated by persons skilled in the relevant art, a removable storage unit 206 includes a computer usable storage medium having stored therein computer software and/or data. Examples of additional means creating secondary memory 203 may include a program cartridge and cartridge interface (such as that found in video game devices), a removable memory chip (such as an EPROM, or PROM) and associated socket, and other removable storage units 206 and interfaces 205 which allow software and data to be transferred from the removable storage unit 206 to the computer system.

The electronic device may also include a communications interface 207. The communications interface 207 allows software and data to be transferred between the electronic device and external devices. The communications interface 207 may include a modem, a network interface (such as an Ethernet card), a communications port, a PCMCIA slot and card, or other means to couple the electronic device to external devices. Software and data transferred via the communications interface 207 may be in the form of signals, which may be electronic, electromagnetic, optical, or other signals capable of being received by the communications interface 207. These signals may be provided to the communications interface 207 via wire or cable, fiber optics, a phone line, a cellular phone link, an radio frequency link or other communications channels. The communications interface in the system embodiments discussed herein facilitates the coupling of the electronic device with data entry devices 208, which can include such manual entry means 209 as keyboards, touch-screens, mouses, and trackpads, the device's display 210, and network connections, whether wired or wireless 213. It should be noted that each of these means may be embedded in the device itself, attached via a port, or tethered using a wireless technology such as BLUETOOTH®.

Computer programs (also called computer control logic) are stored in main memory 202 and/or secondary memory 203. Computer programs may also be received via the communications interface 207. Such computer programs, when executed, enable the processor device 200 to implement the system embodiments discussed below. Accordingly, such computer programs represent controllers of the system. Where embodiments are implemented using software, the software may be stored in a computer program product and loaded into the electronic device using a removable storage drive or interface 205, a hard disk drive 204, or a communications interface 207.

Persons skilled in the relevant art will also be aware that while any device must necessarily comprise facilities to perform the functions of a processor 200, a communication infrastructure 201, at least a main memory 202, and usually a communications interface 207, not all devices will necessarily house these facilities separately. For instance, in some forms of electronic devices as defined above, processing 200 and memory 202 could be distributed through the same hardware device, as in a neural net, and thus the communications infrastructure 201 could be a property of the configuration of that particular hardware device. Many devices do practice a physical division of tasks as set forth above, however, and practitioners skilled in the art will understand the conceptual separation of tasks as applicable even where physical components are merged.

This invention could be deployed in a number of ways, including on a stand-alone electronic device, or as a web application. Persons of ordinary skill in the art will recognize a web application as a particular kind of computer program system designed to function across a network, such as the internet. A schematic illustration of a web application platform is provided in FIG. 3. Web application platforms typically include at least one client device 300, which is an electronic device as described above. The client device 300 connects via some form of network connection to a network 301, such as the Internet. Also connected to the network 301 is at least one server device 302, which is also an electronic device as described above. Of course, practitioners of ordinary skill in the relevant art will recognize that a web application can, and typically does, run on several server devices 302 and a vast and continuously changing population of client devices 300. Computer programs on both the client device 300 and the server device 302 configure both devices to perform the functions required of the web application 307. Web applications 307 can be designed so that the bulk of their processing tasks are accomplished by the server device 302, as configured to perform those tasks by its web application program, or alternatively by the client device 300. However, the web application must inherently involve some programming on each device.

Figure 3:
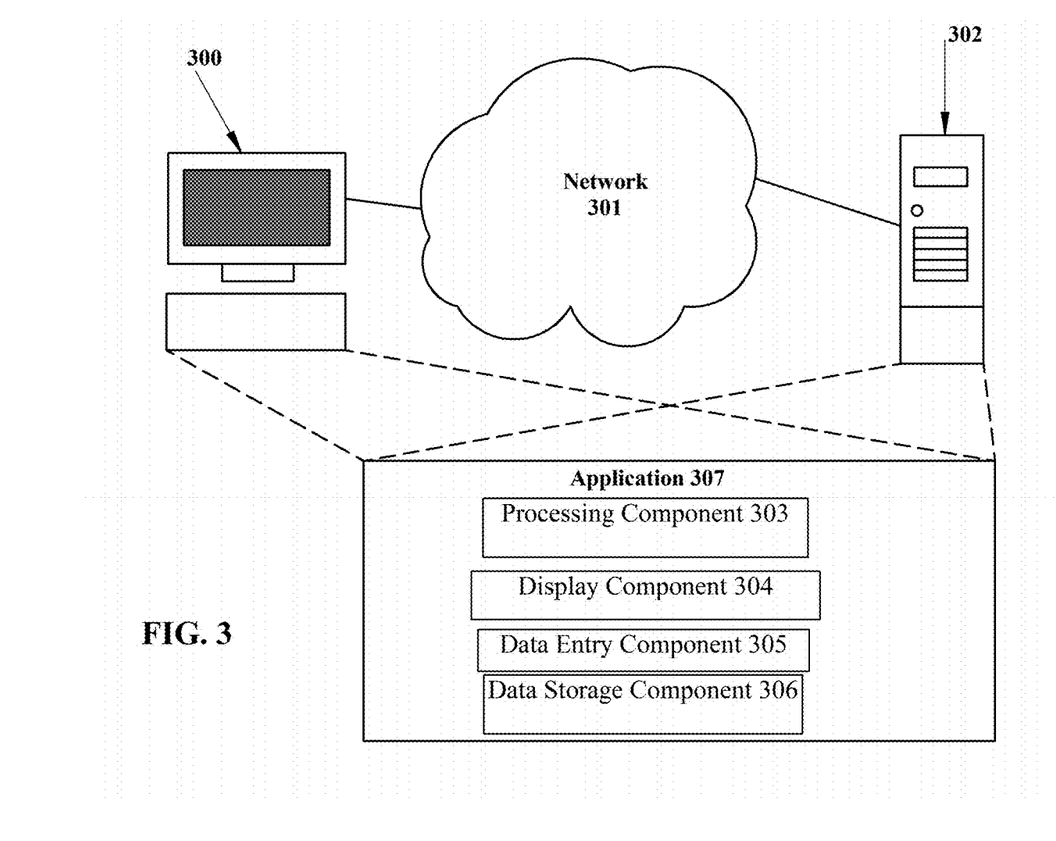
FIG. 3 is a schematic diagram illustrating a web application's structure, and the elements of the claimed system.

Many electronic devices, as defined herein, come equipped with a specialized program known as a web browser, that enables them to act as a client device 300 at least for the purposes of receiving and displaying data output by the server device 302 without any additional programming. Web browsers can also act as a platform to run so much of a web application as is being performed by the client device 300, and it is a common practice to write the portion of a web application calculated to run on the client device 300 to be operated entirely by a web browser. Such browser-executed programs are referred to herein as "client-side programs," and frequently are loaded onto the browser from the server 302 at the same time as the other content the server 302 sends to the browser. However, it is also possible to write programs that do not run on web browsers but still cause an electronic device to operate as a web application client 300. Thus, as a general matter, web applications require some computer program configuration of both the client device 300 (or devices) and the server device 302 (or devices). The computer program that comprises the web application component on either electronic device's system FIG. 2 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Finally, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein. The term "application," as used herein, is any program or set of programs, including a web application, designed to work together to practice the disclosed invention.

Figure 1:
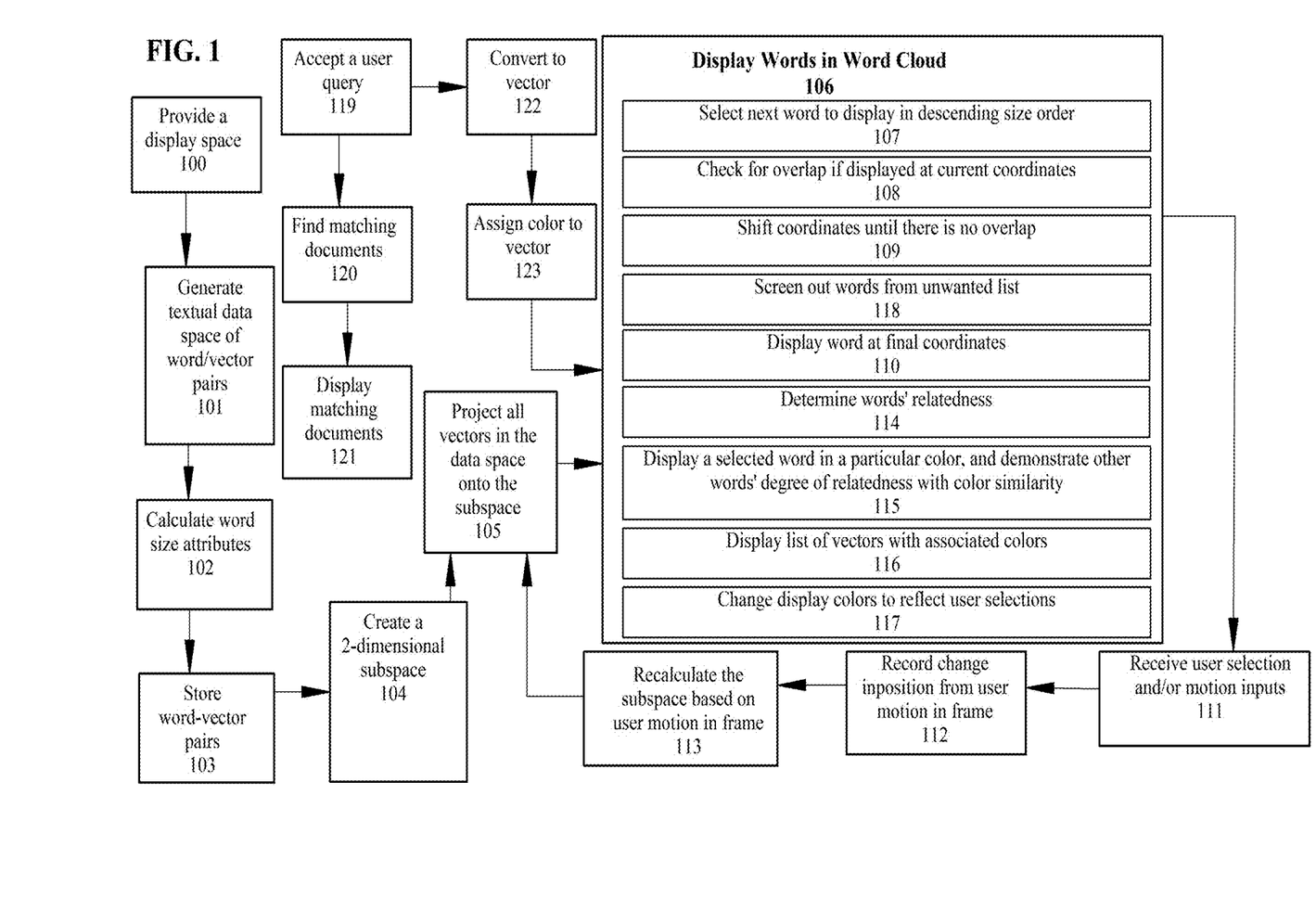
FIG. 1 is a flow chart illustrating the disclosed method.

FIG. 1 illustrates the disclosed method. An electronic device or set of devices connected by a network such as the internet perform the steps of the disclosed method. The device or devices create a display space 100, which is a matrix of points corresponding to pixels that will display on a device's display means. Each point on the matrix may be mapped to two-dimensional coordinates; the prototype used a horizontal x coordinate and a vertical y coordinate, but other choices, such as polar coordinates, are possible. The use of such a display space should be familiar to persons of ordinary skill in the art. Next, the device or devices generates a textual data set 101. As used herein, the elements of a textual data set are word-vector pairs. A "word," broadly defined as any textually representable string of symbols, may be defined more narrowly for some implementations of the instant invention. For instance, some implementations may use words in the colloquially familiar sense of single words made of letters. The vector associated with each word is populated with n categories of numerical data that concern the word, and is thus an n-dimensional vector as defined herein. The set of all n-dimensional vectors paired to the words in the textual data set span a vector space, assumed for the purposes of this document to be n-dimensional. The electronic device or devices will then calculate a numerical size attribute to associate with each word 102, where the size attribute is defined as some numerical value that determines the font size of the word when displayed in the word cloud. The size attribute could theoretically be any numerical attribute that could be applied to every word or to its associated vector in the textual data set. Preferably, the size attribute will aid in ranking the word against other words via a numerical measure of the word's importance; for instance, word sizes could be calculated in proportion to the number of times the word appears in a given text. The words and associated vectors are stored in the electronic device or devices' memory 103. Persons of ordinary skill in the art will be aware of data structures suitable both for storing vectors as collections of their numerical components (for example, in an array), and for linking each vector to a string or character array variable representing a word, including the use of simple or basic data types, and the creation and use of abstract data types that could group together and save the word, vector, size attribute, and other information about the word-vector pair as useful. Preferably, each vector in the data set should be normalized, because it makes the remaining calculation and display steps much more manageable and easy to scale.

Next, the electronic device or set of devices creates a two-dimensional vector subspace. This can be done in a number of ways, but the prototype accomplished it by finding two orthogonal vectors contained in the vector space spanned by the full set of vectors 104. Persons of ordinary skill in the art will be aware of many ways in which to do this; perhaps the simplest method would be to choose two arbitrary vectors from the data set and calculate the component of the second one which is orthogonal to the first. The two basis vectors, referred to as the xVector and the yVector, were normalized, and as their names suggest formed the basis for the x-y coordinate system the prototype used in the display space. The subspace, however created, should be stored in memory, by storing enough information in memory for the system to be able to ascertain whether any given vector in the n-dimensional data space is or is not in the subspace. The two orthonormal vectors used in the prototype were sufficient information to meet that requirement. Subsequently, the electronic devices project all of the vectors from the data set onto the subspace 105. In the prototype, this was accomplished by calculating the projection of each vector onto the xVector, to obtain the xProjection, which was that vector's projection's x component in the subspace. Then, calculating the projection of the same vector onto the yVector yielded the vector's yProjection, which was the y component of that vector in the subspace. The vectors' projections are then mapped to positions in the display space. As all the vectors in the prototypical textual data set as well as xVector and yVector were normalized, mapping them to the data space was a matter of scaling each xVector and yVector to fit the display space, given a display space height and width in pixels: x_position=0.5*width*xProjection and y_position=0.5*height*yProjection. If the vectors are not normalized, this step is more complicated, and it could be more complicated still if the coordinate system and method of defining the subspace are different.

To create a word cloud, each word is displayed 106 at its corresponding vector's coordinates in the display space. Of course, as each word is more than a pixel in height and length, some choice must be made about how to display each word relative to its coordinates. Each word could be placed with its vertical and horizontal midlines intersecting at the coordinates, for example, or the beginning or end of the word could be placed on that point. Ideally, the placement of the words should be adjusted to avoid overlap, as well. The prototypical way to do that involves displaying the words as described in descending order of size attribute 107. The algorithm must first check whether the word to be displayed would overlap 108 with any previously displayed (and thus, larger) word if displayed at its current coordinates. Overlap detection can be accomplished by a number of techniques familiar to those skilled in the art. One approach is simply to check if the pixels of the displayed word would be located in the same place as any pixel of any previously displayed word. If there is a possibility of overlap, the word's position must be shifted 109 until the displayed word would not overlap with any previously displayed word. The shift could be accomplished by applying any formula that changes the coordinates by some amount without removing the displayed word from the screen. The prototypical invention used x and y coordinates in the display space, and avoided detected overlaps by shifting the x and y parameters outward on a parameterized Archimedian spiral—in other words, for whatever necessary number of iterations t, applying the formula:

$$x = x + \frac{\text{width} \times .05t \times \cos(.05t)}{\text{height}}$$

and $$y = y + .05t \times \sin(.05t).$$

Figure 4:
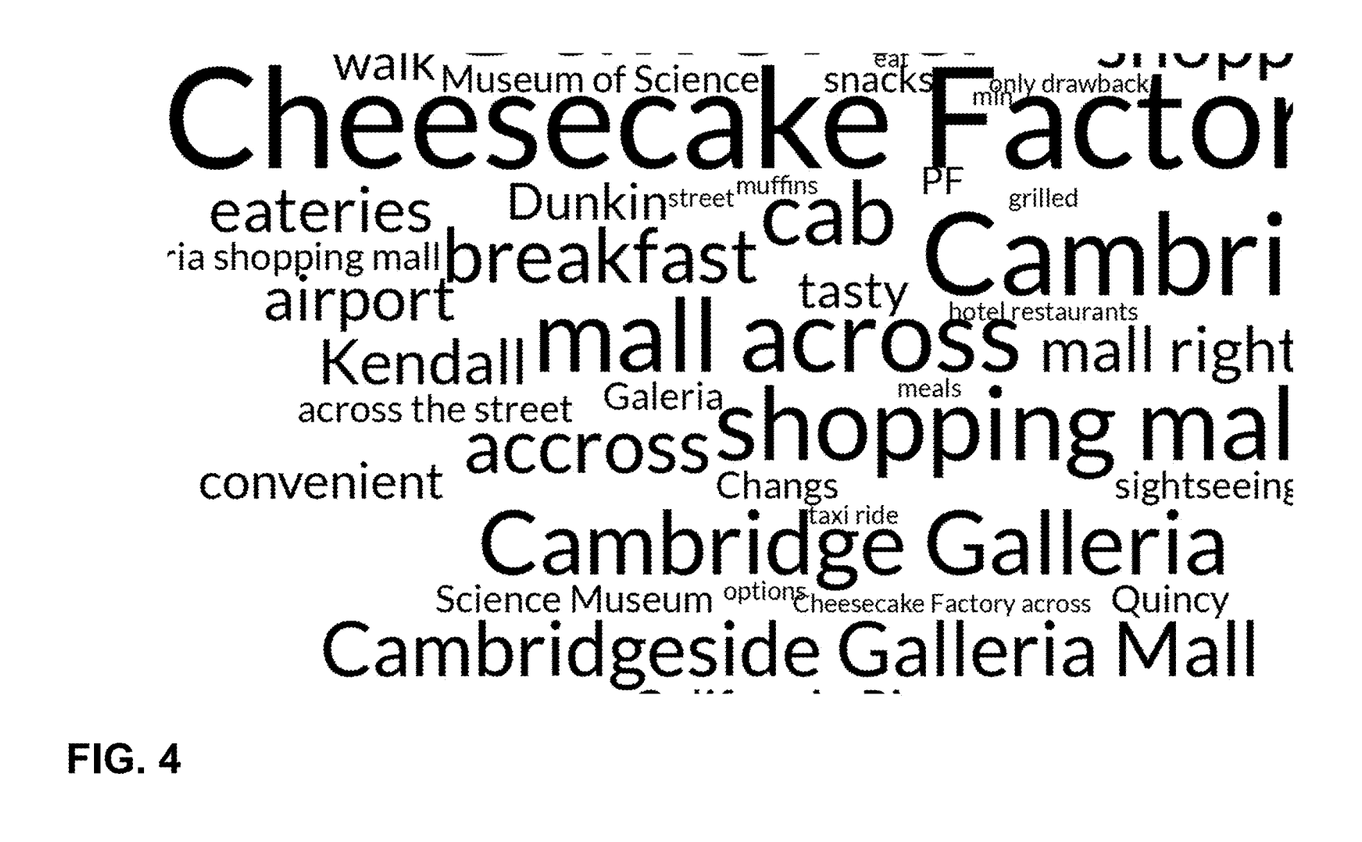
FIG. 4 is a screen-shot of a word cloud produced by an embodiment of the disclosed invention.

This approach creates a pleasing effect, and does not require the words displayed to be shifted too far from their original positions. FIG. 4 is a screenshot of a word-cloud produced by the above-described method.

Once the word cloud has been displayed 106, the user can investigate the data set further FIG. 1 by selecting a word in the cloud 111 and moving it in some direction in the display space 112. This selection and movement 111 could be accomplished by via any manual data entry means at the user's disposal. For example, the user could select a word by clicking on it with a mouse and holding down the mouse button, and move it by moving the mouse on its mouse pad. Alternatively, a single click with a mouse could indicate selection, obviating the need on the user's part to hold down the mouse button as he or she moves the word. The selection and motion could also be accomplished using a touchscreen, track pad, or the keyboard, in which the arrow keys (or any others the implementation designates) could be used to convey the user's desired motion. In response to the user's motion input, the algorithm changes the underlying subspace to a new one with the property that in the new subspace, the projection of the vector corresponding to the selected word will place the word closer to the location to which the user has moved it 113. This process is performed repeatedly while the user is moving the word, so that the word follows the track of the user's movement closely, ideally with imperceptible delay. To do so, it moves at a particular frame rate 112, deriving a new subspace 113 at the end of every frame. The prototypical approach to this recalculation was a three-step process: first the xVector and yVector that formed the basis of the original subspace in the prototype were replaced with an average between each vector and the vector corresponding to the selected word, weighted by the change in x and change in y, respectively, that occurred during the frame. Second, orthogonal versions of the xVector and yVector were produced using the process of Gram-Schmidt orthogonalization. Finally, the modified xVector and yVector was each replaced with an average of itself and its orthogonal version, the average weighted by the change in x and the change in y, respectively. After the creation of the new subspace, all of the n-dimensional vectors are then projected on the new subspace 105, and the words are displayed 106, ideally without the steps of overlap detection 108 and avoidance 109. This is repeated for every frame until the system detects that the user has stopped moving the selected word. The final detection that the user has stopped moving the word could involve any of several techniques depending on the implementation, including event handler based techniques such as detecting when the user released the mouse button if the event that signaled selection involved depressing the mouse button and holding it down, or sampling techniques, such as detecting no change in position through some number of consecutive frames. Once the electronic device or devices have ascertained that the user has stopped moving the selected word, the word cloud is displayed again 106 using the most recently calculated subspace and the projections of all the other vectors onto that subspace. This final display 106 of the shifted word cloud repeats the steps of detecting overlaps 108 and shifting the word locations to avoid overlaps 109 as described above.

A system that performs the above method is illustrated by FIG. 3. The system contains at least one electronic device 300, 302 which has a display, data entry means including manual data entry means, a memory, and a processor. If more than one device is involved, they are linked together by a network 301. The electronic devices' processors are configured by computer programs to operate an application 307. The application 307 may be configured as a web application as described above if more than one electronic device makes up the system. The application 307 is made up of a Processing Component 303, a Display Component 304, a Data Entry Component 305, and a Data Storage Component 306. The Processing Component 303 is configured to generate a textual data set whose members consist of a set of words, each of which is associated with an n-dimensional vector populated by n numerical values, as described above. Those vectors describe an n-dimensional data space, as before. The Processing Component 303 also calculates a size attribute for each word, and creates a two-dimensional subspace of the n-dimensional data space, and calculates the projection of each vector onto that subspace. The Processing Component 303 also calculates a change in the two-dimensional subspace and recalculates the vector projections on the adjusted subspace, given a user-selected vector in the n-dimensional vector space and the change in position, by performing the calculations described for the method embodiment above.

The Display Component 304 of the system displays word clouds in a display space with a two dimensional coordinate system as described above, displaying a word cloud given the set of n-dimensional vectors with calculated projections, ideally following the placement in descending order of size attribute steps already set forth. When displaying a newly created word cloud or displaying a word cloud after a user has finished moving a selected word, the Display Component 304 also should ideally perform the overlap detection and avoidance steps described above. The Data Entry Component 305 captures data entered by the user via the data entry means. In particular, the Data Entry Component 305 captures a user selection of a word displayed in the word cloud by a user using the manual data entry means, and records the selection of that word's corresponding n-dimensional vector. The Data Entry Component 305 also captures a user motion input by selecting a frame rate for animating the movement corresponding to the motion input, and then, for each frame, calculating the change in position corresponding to the portion of the user's motion input that occurred during that frame. Finally, the Data Storage Component 306 stores the vector variables and the linked set of words in the memory of the electronic device or devices 300 so as to preserve each word's relationship with its associated vector. The Data Storage Component 306 also stores the subspace each time it is calculated by the Processing Component 303 in memory, and stores each vector's projection onto the current subspace in the memory as well. It is worth noting that the Processing Component 303, Display Component 304, Data Entry Component 305, and Data Storage Component 306 need not be separate entities or modules within a particular program as implemented. The purpose of their status as elements in the system described in this document is to establish that the processor or processors of any electronic devices 300, 302 comprising the system must be configured to perform their functions as set forth, but not to dictate the architecture of a particular implementation.

According to another embodiment of the method FIG. 1, the generation of the textual data set 101 involves accepting a set of documents, of electronic or other form, finding the list of words in that set of documents, and saving data concerning those words to a matrix. Matrices are used very frequently in representation of textual data. For instance, a matrix in which both the rows and columns are terms, called a term-association matrix, has cells in each of which describes some relationship between the row term and the column term. In that case, if the matrix rows were used as vectors the number of vector components would be equivalent to the number of terms. Another possibility is a term-document matrix: a matrix in which the rows represent terms, the columns represent documents, and each cell contains a number that concerns the relationship between the term in its row and the document in its column; such a matrix would naturally generate a vector space in which the number of documents represented the number of dimensions. For the purposes of this application, the terms can be any word, as defined above. "Documents" may be any collections of such words, including books, articles, papers, web pages, and other collections of words in the colloquial sense, the genomes of organisms, chromosomes, or plasmids, the amino acid sequences representing proteins, and various samples of text or textually representable patterns containing the textual data patterns the user wishes to investigate. It is common for the cells in a matrix representing one or more documents and the terms there into contain numerical measures pertaining to the frequency of appearance of the terms in the documents, including but not limited to a simple count of the number of appearances of a term in a document; it is common for term-association matrices to contain cells counting the number of co-occurrences of the row and column terms. Generation of the matrix generally involves developing a list of terms, often with reference to one or more of the documents in the document set, obtaining some number of lists of anything else including the same terms again, collecting statistical information about the terms from the list from the document set as a whole, with reference to whatever is discussed in the other lists, possibly followed by some calculations using those statistics. It would also be possible to store the values and generate the vector space using a higher-order tensor; for instance, a $3^{rd}$ order tensor could be used to combine the elements of a term-document matrix and a term-association matrix.

There are potentially many ways to obtain the desired vectors from such a matrix. Perhaps the simplest way to do so would be to choose the rows corresponding to the terms as the vectors. However, research has shown that engaging in further manipulations of a matrix and its component vectors can produce a vector representation that proffers superior insights into the relationships between terms. This is especially the case where the algorithm employed produces a representation of fewer dimensions that retains and in some cases concentrates useful information about the higher-dimensional representation implied by the initial matrix. An algorithm that persons skilled in the art will recognize as particularly useful is that of latent semantic indexing (LSI), which reduces a vector space of thousands of dimensions to a much smaller vector space, for example of a hundred dimensions, while significantly improving the ability of the representation to capture subtle relationships between words. Given an M×N matrix C that represents data concerning a text, LSI involves first performing a singular value decomposition (SVD) on C by factoring C as follows: $C=U\Sigma V^T$, where U is a matrix whose columns are the orthogonal eigenvectors of $CC^T$ where the columns of V are the orthogonal eigenvectors of $C^TC$, and where $\Sigma$ is an M×N matrix defined in terms of the eigenvalues of $CC^T$, which are the same as the eigenvalues of $C^TC$ and which are ordered in descending size and denoted as $\lambda_0 \ldots \lambda_i \ldots \lambda_r$, where there are a total of r such eigenvalues. The entries of $\Sigma$ are all zero, except the first r diagonal entries from the upper left corner of the matrix, which are set to the eigenvalues like so: $\Sigma_{ii}=\sqrt{\lambda_{ii}} \forall i$. Since all vectors on which a matrix can operate may be expressed as a linear expression of the matrix's eigenvectors, and since large eigenvalues affect eigenvectors much more strongly than small eigenvalues, if the lower-right diagonal entries of $\Sigma$ are set to zero, producing $\Sigma_k$, the resulting "cropped" matrix $C_k=U\Sigma_k V^T$ will have a very similar effect to that of the original C with regard to transformation of vectors. Thus, producing $\Sigma k$ creates a new $C_k$ that captures a great deal of the information originally in C in far fewer dimensions; it is typical in LSI to start with a C with thousands of dimensions and produce a "cropped" $C_k$ with dimensions on the order of one hundred. As intuition might predict, this produces a much higher information density. The process of LSI has also demonstrated a sometimes uncanny ability to deal with patterns such as synonyms and polysemous words that can frustrate more traditional textual search algorithms. Generating vectors from the rows of $C_k$ allows the algorithm to operate on a smaller and more manageable vector space that represents the relationships between words, and between words and documents, more effectively. As persons skilled in the art will be aware, there are other mathematical algorithms for improving analysis of relationships of words and documents as captured by term-document matrices. In particular, the truncated SVD process can also be run on other forms of matrices representing terms in some way, and indeed on matrices in general. The corresponding system embodiment involves configuring the Processing Component 303 to create a matrix as set forth above, and to use that matrix to generate the n-dimensional vectors used to create the word cloud.

Where the textual data set is derived from a set of documents, the user might wish to be able to look at a document in the set and compare it to the word cloud as portrayed in various projections. To help provide that option, an embodiment of the invention allows the user to enter a search query 119. The query is matched against some representation of the documents from which the textual data set is derived 120, and the most closely matched documents are displayed to the user 121. The process of matching the query to the document 120 could involve any textual searching algorithm known in the art, including string-comparison searches, boolean searches with or without wildcard characters, and any of the various natural language searching algorithms that exist. The exact nature of the search that may be performed will depend on the way in which the document is saved in the device memories; if the entire document is present in the memory, it is obviously possible to search the entire document, whereas if the representation of the document summarizes its contents in some way, the search might be able to proceed much more quickly, but can only be as comprehensive as the summary permits. The display of the documents to the user 121 is also an implementation-specific decision. Perhaps the best approach is simply to list the titles of the documents somewhere outside the display window of the word cloud. The user can then look at the documents that came up as matching, and compare the text within them to the relationships they observe in the word cloud. The related system embodiment involves configuring the Data Storage Component 306 to maintain a representation of each document in its memory, and configuring the Data Entry Component 305 to accept a query from a user via the manual data entry means. The Processing Component is configured to match the query to the document representations stored and retrieved by the Data Storage Component 307, and the Display Component 304 is configured to display matching documents.

Another embodiment of the method FIG. 1 sets the word size attributes 102 based upon a calculation of "term frequency-inverse document frequency" (tf-idf). What tf-idf measures is the importance of a term t in a given document d. Mathematically, tf-idf is a product of the two terms: tf×idf. The first operand, tf, is a statistic reflecting how often t appears in d. As a general matter, tf increases as the number of appearances in the document in question increases. The second term, idf, measures how often the term appears in other documents in a document set D, and decreases as the frequency in other documents in D increases. If the term appears very frequently in one document, and very infrequently in other documents within D, then tf×idf will be large, indicating that for that document in the context of that document set, the term is very important. The reason to use this measure of word-importance, as opposed to a simpler method such as merely counting the number of appearances of a given word, is to avoid inflating the importance of terms that are usually frequent in any document, such as "a" or "the", as their frequency only reflects their importance to language in general, as opposed to the subject matter of the document in question. One could of course design an algorithm that explicitly ignores certain words, like "a" or "the," but using tf×idf means that the writer of the algorithm does not have to find the words in a given set or category of documents that are used sufficiently universally to render those words' frequency useless as a measure of their importance to a particular document in that context. Furthermore, tf×idf for a given word naturally changes with a new choice of D, without requiring any recalibration on the part of a programmer. For example, if d is a patent application, and D is a set of patent applications, tf×idf for the word "invention" would be low, because it appears fairly frequently in all patent documents. In that context, "invention" is not an important word: a user looking at a set of patent applications will already be aware they all concern inventions. However, if d was a patent application (or a collection of patent applications), and D was a set of legal documents from all fields of the law, the word "invention" would have a high tf×idf for d, which would demonstrate a useful fact: that the term "invention" is important for patent applications as distinguished from other legal documents.

As the foregoing discussion illustrates, the term "document" or d and the term "document set" or D can be very broadly defined for tf×idf. For example, D could be a single document, and d could be a collection of sections of that document. On the other hand, d could be a set of documents, such as the set of all documents you have collected on a particular subject, and D could be a larger set of documents, such as some random sampling of documents in general, or of documents expressly not about the subject of the documents that make up d. The usefulness of tf×idf is also not limited to documents made up of language in the conventional sense, as it could be used to discover the relative importance of any pattern that may be represented in textual form within a larger collection of similar patterns, such as a genome, an encrypted text, or a text written in an alphabet that has not been deciphered. It is perhaps unnecessary to note that the use of this statistical analysis of documents is largely a product of the digital age. The use of computers and the internet is of course essential for the rapid collation of sets of documents, the counting of word appearances in all the documents, and the many calculations required to achieve a useful tf×idf for a set of words; the number of man-hours required to perform such operations without digital automation would be prohibitive. In any case the beauty of this mathematical approach to textual analysis is that it can inform a user about the contents of a document of almost any size without the user ever reading the document.

The first operand, tf, is the statistic known as "term frequency," a measure of the number of appearances of the word in a particular document. Term frequency could be a simple count of the number of appearances in the document, denoted f(t,d), where t is the term, and d is the document in which the term is counted. Another method for calculating tf is to scale f(t,d) logarithmically, according to the equation: tf=1+log(f(t,d)) with tf=0 when f(t,d) is zero. Another approach is to divide f(t,d) by the maximum frequency of any term in the document, which avoids the erroneous conclusion that a term is important to a document despite appearing infrequently, merely because the document is long. The second operand, inverse document frequency (idf) is generally rendered as follows:

$$\text{Log}\left(\frac{|D|}{\{d \in D; t \in d\}}\right)$$

where |D| is the number of documents in the document set, and $\{d \in D: t \in d\}$ is the number of documents that contain any appearances of t.

The prototype of the instant invention set word sizes according to tf×idf, further weighted by a factor derived from the word's frequency in the GOOGLE® ngram set, which is a set of term frequency counts for phrases of up to five words throughout the online digital book collection maintained by GOOGLE®. Specifically, where the ngram frequency of a word was gfrequency, the tf-idf would be multiplied by $$\frac{1}{\sqrt{gfrequency}}.$$

For a multiple-word phrase, it may be desirable to estimate the phrase's frequency instead of looking it up in a very large list of GOOGLE® ngrams. If the phrase can be broken into shorter phrases with raw frequencies a and b, one can overestimate the phrase's frequency as $$\frac{a \times b}{a + b}.$$

This operation is chosen because it scales with a and b and follows the associative law, so it can be repeated until the phrase is broken down into single words, and therefore only the frequencies of single words need to be readily available in the computer's memory. The resulting estimate will usually be higher than the actual frequency, but overestimating the frequency tends to lead to a more understandable word cloud than underestimating it. The related system embodiment FIG. 3 involves configuring the Processing Component 303 to calculate a form of tf×idf as described above for each word, and set each word's size attribute based upon that calculation.

Although there are a number of ways to derive the initial subspace 104 as set forth in the method FIG. 1, a particularly useful way to do so is one that ensures that the projection of every dimension in the high-dimensional space points in a different direction on the 2-dimensional plane containing the subspace, with no complete overlaps. One way to do that was used by the prototype of the invention to generate the initial xVector and yVector used by the prototype to define the initial subspace by iterating through all the dimensions, setting $xVector_i = \cos(i)$, $yVector_i = \sin(i) \forall i$. Persons skilled in the art will recognize number denoted by i in this formula as the vector component's index number, and that when used as a subscript, it indicates the component i terms down the list of components that define the vector. For instance, $xVector_5$ is the fifth component of xVector. Most abstract data type representations of vectors allow an algorithm to look up components of the stored vector by index number. The corresponding system embodiment FIG. 3 requires configuring the Processing Component 303 to derive a subspace in a manner that ensures that every dimension in the high-dimensional space points in a different direction on the 2-dimensional plane containing the subspace.

A signal virtue of the above-described method is its ability to give users a intuitive way of exploring virtually any text, containing any number of documents, without necessarily reviewing the documents first. With that ability comes a new problem, which is that the displayed word-cloud could contain terms the user does not want to see, either because they are not useful, or because their display could cause problems for the user. An example of the former case could involve text downloaded from TWITTER®, and the word "RT," which signifies that a message has been "re tweeted" or retransmitted to users of TWITTER®. Virtually any segment of messages on that social networking platform is likely to contain many instances of the word "RT", causing it to display prominently in the word cloud if the corpus from which the idf is taken is not also from the same platform. An example of the latter is the use of profane language, or personal information. In either case, a list can be maintained of objectionable term categories, and at some point in the above method, each word could be compared to that list, and its treatment altered as a result 118. In the simplest case, the entries in the list could be words themselves, such as swear words or words like "RT," and a simple string comparison could suffice to determine that the word should be suppressed. More complex examples could be the suppression of nine-digit decimal numbers containing dashes after the third and fifth digit, such as social security numbers, which would require comparison by pattern to a form template stored in the list. The exact treatment 118 of words that match the list is also an implementation-specific question: some users might want to know that some words are there, for instance, as represented by a dot or other masked notation, while other words might be better omitted entirely. The user could be given a choice of default screening lists, or the ability to create one by custom. The corresponding system embodiment involves configuring the Data Storage Component 306 to maintain such a list, configuring the Processing Component 303 to compare words from the textual data set to the word categories on the list, and configuring the Display Component 304 to alter the display of any word that matches a category from the list.

In some embodiments of the invention, the word cloud is further enhanced to show the user relationships between the words. The method FIG. 1 for doing this requires performing a calculation to determine two words' degree of relatedness 114. What makes two words closely or distantly related varies with the implementation. One fairly well-known approach is to count how often two words appear within a certain number of words of each other in a document or set of documents; the higher the frequency of such appearances, the more closely the words would be said to be related. Persons of ordinary skill in the art will be aware of other ways to gauge relatedness. The degree of relatedness is depicted in the word cloud using color similarity 115: if the user has selected a word, it displays in the word cloud in a color that contrasts with the default color of the word cloud. Other words are displayed in colors that are more similar to the selected word's color if the other words are closely related. A numerical quantity or relationship may be readily mapped to a color using the numerical color schemes common in graphics software. The corresponding system embodiment FIG. 3 involves configuring the Processing Component 303 to calculate degree of relatedness between two words, and configuring the Display Component 305 to display the selected word in a color contrasting with the default color, and to display other words with coloration indicating the degree of relatedness with the selected word.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be 1, whereas if they are pointing in opposite directions, the angle between them is π radians, and the cosine of that angle will be −1. If the angle is greater than π radians, the cosine is the same as it is for the opposite angle; thus, the cosine of the angle between the vectors varies inversely with the minimum angle between the vectors, and the larger the cosine is, the closer the vectors are to pointing in the same direction. The cosine of the angle θ between two vectors a and b may be calculated as follows:

$$\cos(\theta) = \frac{a \cdot b}{\|a\|\|b\|}.$$

A method embodiment FIG. 1 involves using cosine similarity between the n-dimensional vectors associated with two words to assess the words' degree of relatedness 114. The corresponding system claim FIG. 3 involves configuring the Processing Component 303 to determine the degree of similarity between two words based upon cosine similarity.

Another embodiment of the method FIG. 1 involves allowing the user to select more than one topic and use coloration to indicate which words in the word cloud are most related to the selected topics. The method to do so is to allow the user to create a list of vectors in the data space, which may or may not be words that appear in the word cloud, and displaying a different color next each vector in that list 116. When the user selects some of the vectors on the list, the display color of the words in the cloud is changed to reflect those words' similarity to the selected words 117. This may be accomplished by calculating the cosine similarity of each word in the word cloud to each selected vector. The contribution of each selected vector's color to the color of a displayed word will be in proportion to the cosine similarity of that vector to that word. For example, in a system where each display color is defined by a number between 0 and 255 representing each of red, green, and blue, (the total value being called its "RGB" value) each word in the cloud may be initialized to a certain RGB value that represents the base or background value, at which every word in the cloud will display if no vector has been selected to which the words may be compared. When a set of vectors has been selected from the list, the algorithm loops through the selected vectors with regard to each word in the cloud; for each selected vector, its relatedness to the word is assessed using cosine similarity to that word's vector, and the red, green, and blue values of the vector's RGB are each multiplied by a number proportional to that degree of similarity, and added to the red, green, and blue values of the word's RGB. The result is that the word's red, blue, and green values will be more similar to the most RGB of the most cosine-similar vector on the list, but also somewhat similar to other fairly cosine-similar vectors. The color values of vectors on the list whose cosine similarity to the word is less than or equal to zero will be not be added to the word at all; thus words related to none of the vectors in the selected list will remain at the background color. The most similar vector of all can have its weight augmented, by raising to a certain power, or multiplying by some factor, to emphasize the closeness of the relationship. When the word has received all of the terms' contributions to its RGB, the RGB must be scaled, and may need to be rounded, to fit each value to an integer between 0 and 255. Further tuning can be made to brighten colors and produce other aesthetic effects, by adjusting the RGB values slightly to make them more appealing or noticeable.

The associated system embodiment involves configuring the Display Component 304 to display the list of vectors with associated colors, and to change the display colors of other words in the list to reflect those words' similarity to the selected words. The Data Entry Component 305 is configured to record the user selections of words on the list.

One way to create the list of vectors to compare to the word cloud as described above is to accept search queries from the user 119, and convert the queries into vectors in the n-dimensional data space 122. This is accomplished by parsing the query for words in the textual data set, and then using the set of words thus acquired to map the query to the vector space. It is worth reiterating at this point that the words in the textual data set, as defined herein, could include phrases, and thus the query might most closely match a phrase, as opposed to a collection of words; furthermore, the query might match equally well a phrase and a single word, in which case the implementation could include each in the list of set of words used in the mapping, or alternatively the list could be culled according to some matching score. Of course, the process of mapping a query to the vector space will depend on the significance of the dimensions of that space. For instance, if the vector space was built using a term-document matrix, the dimensions are documents, or are derived from documents, and the query might be built by adding together the words from the set of words found in the query. If the vector space was built using a term-association matrix, on the other hand, the dimensions in the space are derived from the words themselves, and the query could thus be built using its word set to create components. The information from the word-associated vectors could also be included in the query vector creation process 122. Once the query vector is created 122, it must be assigned a color 123 so that its selection by the user can highlight related terms. The vector could be assigned a default color from a set of visually distinct colors maintained in the device memory. It might also be advisable to permit the user to customize the vector color, as this color shading process is meant to allow users to use their visual intuition to explore relationships between words, and the user's choice of a color could be guided by that intuition as well; in any case, the choice of colors is partially an aesthetic choice, and users' ability to exercise their own tastes in the matter will lead to greater user satisfaction. Once the vector is created and assigned its color, the vector and color are saved together in the device memory and displayed as a member of the list as discussed above. As may be apparent, this embodiment could be combined with the ability to search documents used to create the textual data set, permitting the query to be compared simultaneously to the documents it matches, and to the words in the cloud. As before, anything that can be represented as a vector in the data space can be represented as a vector on the list, along with the user queries.

The corresponding system embodiment involves configuring the Data Entry Component 305 to accept a user-input search query. The Processing Component 303 is designed to convert the query into a vector in the n-dimensional data space and to assign a display color to the vector; of course if user-customized colors are permitted by the implementation, the Display Component 304 should be configured to show the user options and the colors selected thus far, and the Data Entry Component 305 should be configured to accept the user choice of colors. However the color is assigned to the vector, the Data storage Component 306 should be configured to store the vector and the associated color in the device memory. Finally, the Display Component 304 should be configured to display the vector, with its associated color, as a member of the list from which the user can select vectors to show their relatedness to words in the cloud as described above.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method performed by at least one electronic device having a processor and a memory for exploring an n-dimensional textual data set using word cloud representations of two-dimensional projections of the data set, comprising:
   providing a display space with a two dimensional coordinate system;
   generating a textual data set whose members comprise a set of words, each of which is associated with an n-dimensional vector populated by n numerical values, said vectors defining an n-dimensional data space;
   storing said textual data set in said memory so as to preserve each word's relationship with its associated vector;
   calculating a size attribute for each word in said textual data set;
   creating an initial two-dimensional subspace of the n-dimensional data space and storing said subspace in said memory;
   calculating the projection of each said n-dimensional vector onto said subspace, and saving said projection to memory;
   displaying a word cloud by performing steps comprising:
      placing each word from the textual data set in said display space at coordinates determined by its projection on said subspace; and
      displaying said word with a font size corresponding to its size attribute;
   receiving a user's selection of a word displayed in the word cloud via said electronic device's manual data entry means;
   receiving a user's motion input via said electronic device's manual data entry means;
   shifting said word cloud by performing steps comprising:
      selecting a frame rate for animating the movement corresponding to said user's motion input;
      for each frame, calculating the change in position in the display space corresponding to the portion of said user's motion input that occurred during said frame;
      replacing said two-dimensional subspace with another two-dimensional subspace in which the projection of the selected word's associated vector causes the selected word to be displayed at the new location dictated by said change in position;
      projecting each vector on the new subspace and saving each said projection to said memory;
      placing each word at coordinates in said display space corresponding to its vector's new projection; and
      repeating for each frame until detecting cessation of motion;
   upon cessation of motion, repeating the steps comprising displaying a word cloud using each word's associated vector's most recent projection on the most recent subspace.

2. A method according to claim 1, wherein the step of generating a textual data set comprises:
   providing a set of documents;
   obtaining said words from said documents;
   creating a matrix containing data concerning said words and documents; and
   using said matrix to produce said n-dimensional vectors.

3. A method according to claim 2 further comprising:
   maintaining some representation of each document from said document set;
   accepting a user-input search query;
   matching said query to said document representations; and
   displaying documents that match said query.

4. A method according to claim 1, wherein the size attribute of each word is determined using a term frequency-inverse document frequency calculation.

5. A method according to claim 1, wherein the initially created subspace is one wherein the projection on the subspace of each of the n dimensions points in a distinct direction.

6. A method according to claim 1, further comprising:
   maintaining a list of word categories in said memory; and
   altering the display of any word that matches a category from said list.

7. A method according to claim 1, further comprising:
   calculating a metric for degree of relatedness between two words in said textual data set;
   receiving a user selection of a word;
   displaying said selected word in a color that contrasts with the default display color; and
   displaying all other words in the textual data set with coloration indicating the degree of relatedness between that each word and the selected word.

8. A method according to claim 7 wherein the degree of relatedness between two words is determined by cosine similarity between said words' associated vectors.

9. A method according to claim 7 further comprising:
enabling a user to create a list of vectors in said n-dimensional data space each of which is associated with a color;
recording a user selection of one or more vectors from said list; and
changing the display color of each word in said word cloud to reflect its similarity to each of said selected vectors.

10. A method according to claim 9, wherein said user creation of a vector on said list of vectors comprises:
accepting a user-input search query;
converting said user-input query into a vector in said n-dimensional data space;
assigning a display color to said vector;
saving said vector with said display color in said device memory; and
displaying said vector with said display color as a member of said list of vectors.

11. A system for displaying an n-dimensional textual data set as a word cloud comprising one electronic device, or a set of two or more electronic devices linked by a network, coupled to a display and to data entry means including manual data entry means, each electronic device having a memory, and a processor, said processors together or singly operable to execute instructions to perform functions comprising:
a Processing Component configured to:
generate a textual data set whose members comprise a set of words, each of which is associated with an n-dimensional vector populated by n numerical values, said vectors defining an n-dimensional data space;
calculate a size attribute for each word in said textual data set;
create an initial two-dimensional subspace of the n-dimensional data space;
calculate the projection of each said n-dimensional vector onto said subspace; and
derive a new subspace and vector projections thereon given a user-selected vector in said n-dimensional vector space and a variable representing change in position within a display space;
a Display Component configured to display word clouds in a display space with a two dimensional coordinate system, and specifically to perform steps comprising displaying a word cloud given a set of n-dimensional vectors with calculated projections and corresponding words with calculated size attributes by:
placing each word at coordinates determined by its vector's projection; and
displaying said word with a font size corresponding to its size attribute;
a Data Entry Component configured to capture data entered by the user via said data entry means, and particularly to:
capture a selection of a word displayed in said word cloud by a user via said manual data entry means, and record the selection of that word's corresponding n-dimensional vector;
capture a user motion input by:
selecting a frame rate for animating the movement corresponding to said user's motion input;
for each frame, calculating the change in position corresponding to the portion of said user's motion input that occurred during said frame; and
repeating for each frame until the cessation of said motion input; and
identifying the cessation of the motion input;
a Data Storage Component configured to
store said textual data set in said memory so as to preserve each word's relationship with its associated vector;
store said subspace in said memory; and
store each vector's projection in said memory.

12. A system according to claim 11, wherein said Processing Component is configured to perform said generation of said textual data set by:
providing a document set comprising n documents;
creating a matrix containing data concerning said words and documents; and
using said matrix to produce said n-dimensional vectors.

13. A system according to claim 12, wherein said Data Storage Component is configured to maintain in said memory a representation of each document in said set of documents, wherein said Data Entry Component is configured to accept a query from a user via said manual data entry means, wherein said Processing Component is configured to match said query to said document representations, and wherein said Display Component is configured to display matching documents.

14. A system according to claim 11, wherein said Processing Component is configured to calculate each word's size attribute using a term frequency-inverse document frequency calculation.

15. A system according to claim 11, wherein the Processing Component is further configured to initialize said subspace so that the projection on the subspace of each of the n dimensions points in a distinct direction.

16. A system according to claim 11, wherein said Data Storage Component is further configured to maintain in said memory a list of word categories, wherein said Processing Component is configured to compare words from the textual data set to the word categories on said list, and wherein said Display Component is configured to alter the display of words matching said word categories.

17. A system according to claim 11, wherein said Processing Component is configured to calculate a metric for degree of relatedness between two words and wherein said Display Component is configured to display said selected word in a color that contrasts with the default display color and to display all other words with coloration indicating the degree of relatedness between each word and the selected word.

18. A system according to claim 17 wherein said Processing Component is configured to calculate said metric for degree of relatedness between two words using cosine similarity between said two words' associated vectors.

19. A system according to claim 11 wherein said Display Component is configured to display a list of vectors in said n-dimensional data space each of which is associated with a color, and given one or more selected vectors from said list to change the display color in the word cloud of each word to reflect its similarity to each vector selected, and wherein said Data Entry Component is configured to record user creation of a list of vectors with associated colors, and to record a user selection of one or more vectors from said list.

20. A system according to claim 19, wherein said Data Entry Component is configured to accept a user-input search query, wherein said Processing Component is configured to convert said user-input query into a vector in said n-dimensional data space and to assign a display color to said vector, wherein said Data Storage Component is configured to save said vector in said device memory with said display color, and wherein said Display Component is configured to display said vector with said display color as a member of said list of vectors.

* * * * *